PUSH BUTTON TUNING SIGNAL-SEEKING RECEIVER
Filed Oct. 6, 1945
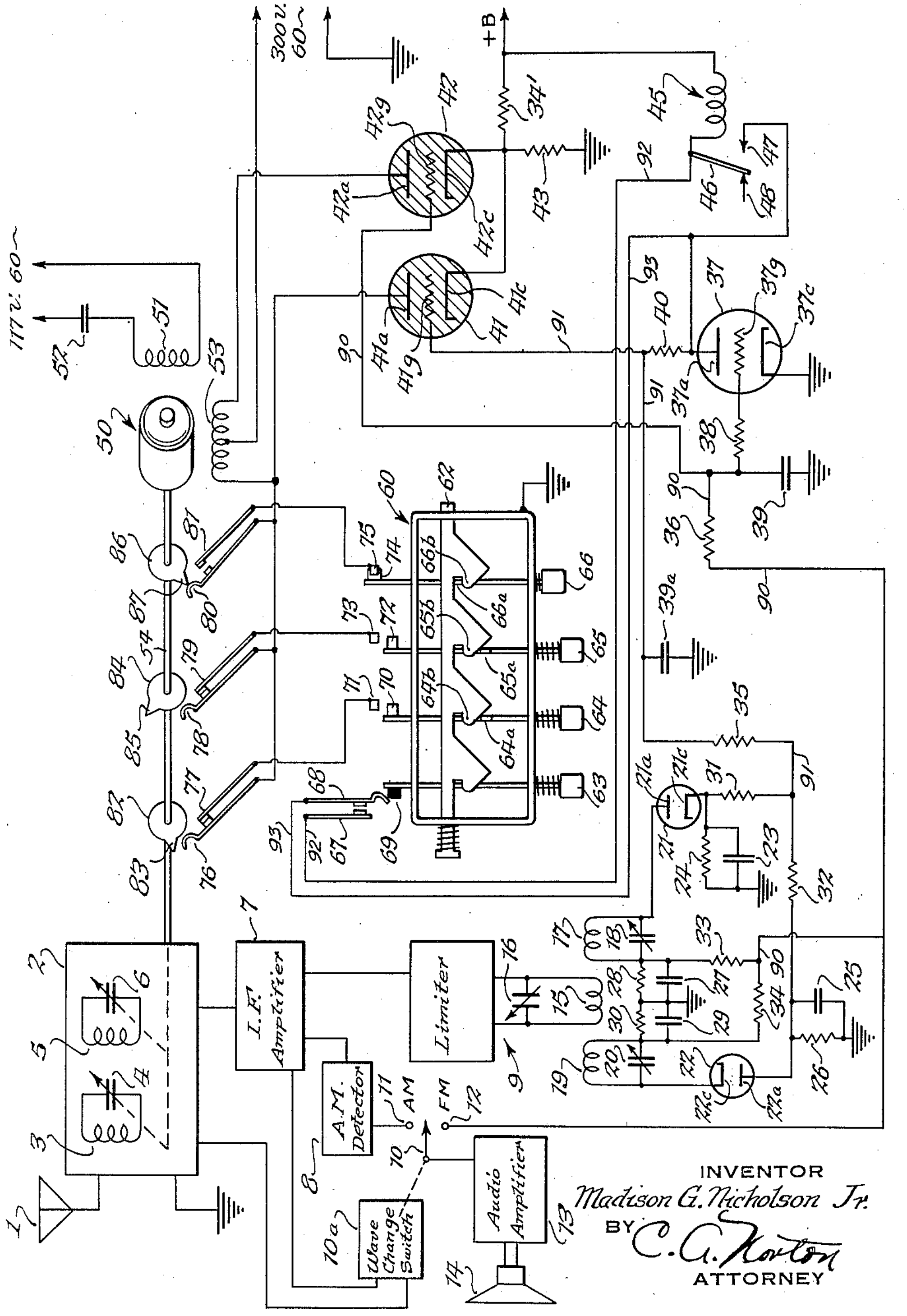
INVENTOR
Madison G. Nicholson Jr.
BY C. A. Norton
ATTORNEY Patented Mar. 7, 1950 2,499,967

UNITED STATES PATENT OFFICE 2,499,967

PUSH-BUTTON TUNING SIGNAL-SEEKING RECEIVER

Madison G. Nicholson, Jr., Snyder, N. Y., assignor to Colonial Radio Corporation, Buffalo, N. Y.

Application October 6, 1945, Serial No. 620,727

17 Claims. (Cl. 250—40)

This invention relates to radio receiving apparatus, and more particularly to radio receiving apparatus of the "signal-seeking" or "stop-on-carrier" type provided with push button tuning, and arranged to operate on either amplitude modulated (A. M.) or frequency modulated (F. M.) signals.

This application is related to my earlier application, Serial No. 557,312, "Push button control of signal-seeking receiver," now United States Letters Patent No. 2,394,869, granted February 12, 1946; No. 563,117, "Signal-seeking receiver for frequency modulated signals," now United States Letters Patents No. 2,478,977, granted August 16, 1949; and No. 609,574, "Signal-seeking receiver for A. M. and F. M. signals," now United States Letters Patent No. 2,487,772, granted November 8, 1949, the latter patent granted jointly with John C. Pontius, and all of said patents being assigned to the assignee of the present patent.

"Signal-seeking" or "stop-on-carrier" receivers are receivers in which the tuning means is operated by a source of power and the change of tuning is stopped by the action of the receiver itself when it tunes in a signal.

As will be readily understood, if the stopping action is made operative on the full sensitivity of the receiver, a great many transmitting stations may be tuned in, and the operator may be bothered by the large number of stations receivable on which the tuning will stop. For instance, he may be interested merely in receiving signals from local stations, whose programs are usually printed in the daily newspapers, and he may desire to listen only to one particular local station at a particular time, and at another time to another particular local station.

Some of these stations may be transmitting with amplitude modulation, others with frequency modulation, or the same station may be transmitting at different times with different types of modulation. If the operator is to be able to receive what he wants, the receiver must be capable of responding both to amplitude modulation and to frequency modulation, and must be quickly convertible from one to the other.

In case a series of push buttons is provided, each button should condition the receiver so that it will respond by signal-seeking action to only the station for which the particular push button has been preset, regardless of whether that station is transmitting by amplitude or frequency modulation.

It is an object of this invention to provide such a receiver as above described; that is, one which operates on the signal-seeking or stop-on-carrier principle, but in which individual station push buttons can be operated to select a particular desired station to the exclusion of all other stations, and in which the presetting of stations does not require extreme precision either in the apparatus itself or in the presetting of the stations, and in which the lay owner of the receiver can preset various stations without the use of tools and without requiring the services of a skilled servicemen.

It is a further object of this invention to provide such a receiver in which the tuner motor drives the tuner at a relatively high rate of speed, except when the tuning approaches a desired station frequency, at which time the tuner operates at a slower rate.

Still other objects and advantages of my invention will be apparent from the specification.

The features of novelty which I believe to be characteristic of my invention are set forth with particularity in the appended claims. My invention itself, however, both as to its fundamental principles and as to its particular embodiments, will best be understood by reference to the specification and accompanying drawing, in which The single figure is a circuit diagram of a receiver in accordance with my invention.

Referring now more particularly to the drawing, 1 represents an antenna of any suitable type feeding the R. F. amplifier or amplifiers, if used, and the converter or first detector of a superheterodyne. Various tuned circuits may be employed in this unit as will be understood, but for the purpose of simplicity I have shown only two tuned circuits comprising inductances 3 and 5, each shunted by condensers 4 and 6 respectively.

The output of the converter may be supplied to intermediate frequency amplifier 7 of any suitable type. The output of intermediate frequency amplifier 7 is applied to amplitude modulation detector 8 and a frequency modulation limiter and detector 9, selection of the output of either detector being made in accordance with the signals to be received by switch 10, which connects audio amplifier 13 and loud speaker 14 to the output of the amplitude modulation detector 8 when the switch is closed against contact 11, and to the output of the frequency modulation limiter and detector 9 when the switch is connected to contact 12.

Because the frequency channels of the amplitude modulation broadcast stations and frequency modulation broadcast stations are usually different, I may provide a wave change switch 10a ganged with A. M.-F. M. selection switch 10 connected to converter unit 2 and to I. F. amplifier 7 for making changes both in the tuned circuits of the R. F. amplifier-converter and in the I. F. amplifier circuits, although for reception of stations which broadcast either with amplitude modulation or frequency modulation at different times on the same frequency channel, provision may be made for operating these switches independently of each other.

Limiter and detector stage 9 may include a limiting amplifier feeding limiter output coil 15 shunted by trimming condenser 16. The output of the limiter may be supplied to a double discriminator comprising a first tuned circuit made up of inductance 17 coupled to inductance 15 and shunted by trimmer condenser 18, and a second tuned circuit made up of inductance 19 shunted by trimmer condenser 20, also coupled to inductance 15. One of these tuned circuits, as will be understood, will be tuned above, and the other below, the mean F. M. carrier frequency in the output of the intermediate frequency amplifier, as will be understood by those skilled in the art.

One terminal of condenser 18 and inductance 17 may be connected to anode 21*a* of diode 21, and cathode 21*c* thereof may be connected through resistance 24, shunted by condenser 23, to ground. The other terminal of inductance 17 and condenser 18 may be connected through resistance 28, shunted by condenser 27, to ground.

Similarly, one common point of inductance 19 and condenser 20 may be connected through resistance 30 shunted by by-pass condenser 29 to ground, and the other common point of inductance 19 and condenser 20 may be connected to cathode 22*c* of diode 22, anode 22*a* of which is connected through resistance 26, shunted by condenser 25, to ground.

Cathode 21*c* of diode 21, and anode 22*a* of diode 22, may be connected together through resistances 31 and 32, and it will deliver at the junction point, for example, a positive voltage with respect to ground when the carrier frequency is on one side of the mean, or unmodulated, value, and a negative voltage when the carrier frequency is on the other side of the mean value, within certain limits.

The ungrounded common point of resistance 30 and condenser 29, and the ungrounded common point of resistance 28 and condenser 27, may be connected together through resistances 33 and 34 and will deliver at the junction point of the latter a negative voltage with respect to ground when the voltage from resistances 31 and 32 is positive and positive when the latter is negative. Each of these voltage outputs is in the form of the well-known discriminator network output curve, resembling the letter S lying on its side, the output curve of the one being inverted with respect to the other, and both being zero or substantially so at mean or unmodulated carrier frequency.

A pair of thyratrons 41 and 42 may be provided for controlling the tuner motor indicated at 50. Ground may be applied to the common point of resistor 35 and control electrode 41*g* of thyratron 41 through capacitor 39*a*. Cathode 41*c* of thyratron 41 may be connected to cathode 42*c* of thyratron 42, and thence to ground through resistance 43, and also to B+ through resistance 34′.

The common point of resistances 33 and 34 may be connected through conductors 90 and resistance 36 to control electrode 42*g* of thyratron 42 and also through resistance 38 to control electrode 37*g* of amplifier tube 37, cathode 37*c* of which may be grounded, and anode 37*a* of which may be connected through resistance 40 to control electrode 41*g* of thyratron 41.

The output of tube 37 may control lock-in relay 45, the coil of which may be connected at one end to B+ and at the other end to armature 46, and also through conductor 92 to switch contact 67 located on the push button frame. Back contact 48 may be left unconnected, whereas front contact 47 of relay 45 may be connected to anode 37*a* of tube 37 and through conductor 93 to contact 68 on the push button frame.

Tuning motor 50 is preferably a squirrel cage induction motor of the type having one field winding 51 energized directly from a 60 cycle line through condenser 52 and the other winding 53 a split winding in quadrature relation with winding 51 and having its terminals connected respectively to anodes 41*a* and 42*a* of thyratrons 41 and 42, and its midpoint connected to a 300 volt, 60 cycle terminal, the other terminal of which is grounded. As will be understood, a motor so arranged and connected is reversible and its direction of rotation is determined by whichever half of winding 53 is energized.

The shafts 54 of tuner motor 50 drives the tuning elements in converter unit 2, which may, for instance, be the tuned circuits of the R. F. amplifier or amplifiers, and those of the oscillator, which are ganged together as in conventional superheterodyne practice.

Mounted in spaced relation on the shaft 54 of tuner motor 50 I may provide a series of thumb wheels 82, 84, and 86 mounted on the shaft in such a manner that normally, as the shaft is rotated, they turn with the shaft, but having frictional engagement therewith so that each one may be turned to a particular desired angular position on the shaft and will remain in that position, rotating with the shaft until they are reset.

Each of these thumb wheels may carry cam 83, 85, and 87 respectively, engaging contact 76, 78, and 80 respectively. Contacts 76, 78, and 80 respectively are normally closed against contacts 77, 79, and 81 respectively, and are only opened during the small angle during which the respective cam passes across the spring contact, and moves it out of engagement with its stationary contact.

Stationary contacts 77, 79, and 81 are connected respectively to stationary contacts 71, 73, and 75 associated with, and mounted on, push button casing 60 to be engaged by the respective station selector push button plungers 64, 65, and 66. These push button plungers may each be provided with notch 64*a*, 65*a*, and 66*a*, each of which may be engaged by corresponding notch or latch 64*b*, 65*b*, and 66*b* on latch bar 62. Each of these plungers may carry contacts 70, 72, and 74 respectively to engage fixed contacts 71, 73, and 75 when the corresponding push button is in depressed position.

Since casing 60 is grounded, it will be observed that, so long as any one of the spring switches actuated by cams 83, 85, and 87 are closed, a circuit is completed from ground through one of the pairs of contacts 70—71, 72—73, or 74—75, and through any one of cam switches 76—77, 78—79, and 80—81 through the left half of motor winding 53 to the 300 volt alternating source, thence to ground.

Station-selecting plungers 64, 65, and 66 and their corresponding cam switches 76—77, 78—79, and 80—81, are herein shown for the sake of simplicity as three in number, but it will be understood that as many may be provided as will be ordinarily desired; for instance, six to eight, or even more, and that these may be calibrated or preset for desired stations, either A. M. or F. M., or part of them for A. M. and part of them for F. M. stations.

In addition to the station-selector plungers, I may provide signal-seeking plunger 63, only one of which is necessary; and since this plunger does not need to be held in, no locking notch will be provided on it. It will, however, be arranged so as to displace latch bar 62 and release any station-selector plunger which happens to be depressed when signal-seeking plunger 63 is pushed.

This plunger carries at its rear end insulation block 69, and when depressed, closes movable contact 68 against fixed contact 67, applying +B voltage through relay coil 45 to anode *37a* of tube 37 and through resistor 40 to control electrode *41g* of thyratron 41.

Various springs may be provided to return plungers 63, 64, 65, and 66 to forward position, and a spring may be provided, normally biasing latch bar 62 toward the left, as seen in the figure. The plunger 66 is shown in depressed and locked-in position, indicating that the receiver is tuned to the station to which plunger 66 is allocated.

The construction of a receiver according to my invention having been described, its operation will now be explained. Supposing that the operator wishes to operate the receiver as a signal-seeking receiver on frequency modulation. He will set switch 10 to F. M. position, which switches the input of audio amplifier 13 to the output of F. M. detector 9, and likewise operates wave switch *10a*, which switch *10a* connects the proper coils in converter 2 and I. F. amplifier 7 for the F. M. frequency band.

He will then depress signal-seeking plunger 63, closing switch contacts 67 and 68 and applying +B voltage to tube 37 and to grid *41g* of thyratron 41 through resistor 40. This operation releases station selector plunger 66 from the depressed position and it moves forward, opening contacts 74 and 75, and opening the circuit of the left half of field winding 53 of tuner motor 50.

The bias applied to thyratron 41 is sufficient to cause this thyratron to fire every half cycle, and tuner motor 50 will be set in operation at a relatively slow speed because thyratron 41 is conducting only for half of each complete cycle. Tuner motor 50 will rotate, driving the tuner in converter 2.

Since all station-selector plungers are now in front position, no operation of the cam switches by operation of cams 83, 85, and 87 enters into this phase, and these may be disregarded. As long as no signals are being received, thyratron 41 will continue to be energized each half cycle, and the tuner motor will continue to turn, changing the tuning.

Suppose, now, that the tuning approaches so nearly to an incoming signal that voltages begin to be built up on conductors 90 and 91. These are so connected that as the tuning approaches the signal, a negative voltage appears on conductor 90, and a positive voltage apears on conductor 91.

As the strength of this voltage reaches a predetermined value, which represents the minimum strength of a readable signal in the loud speaker, the negative bias on the grid of tube 37 becomes sufficient to reduce the value of plate current below the level required to hold in armature 46 against contact 47, and armature 46 moves to back contact 48, cutting off the application of +B voltage through resistor 40 to the grid of thyratron 41.

Since signal-seeking plunger 63 needs to be depressed only momentarily, it will have been released, will have returned to forward position, and contacts 67 and 68 will have been opened at its release. This will not have affected the operation, however, because, as long as no signal is being received, space current flows in tube 37, relay 45 is locked in closed position, and the tuner motor will continue to operate.

When the signal begins to be tuned in and relay 45 opens, continued operation of the tuner motor depends entirely upon the operation of thyratrons 41 and 42, and this operation in turn depends upon the voltage developed from the discriminator network. As the mean carrier frequency is approached, the negative voltage on conductor 90 increases to a maximum and then decreases to zero. As it increases, it cuts off tube 37, as already stated.

In a similar manner, the voltage on conductor 91 increases from zero to a maximum in the positive direction and decreases to zero at the mean carrier frequency. Since the voltage of these conductors is applied to the grids of thyratrons 41 and 42, these grids will respectively go from zero to maximum positive and maximum negative potentials respectively and will then both return to zero at the mean carrier frequency.

As the positive voltage decreases toward zero on the grid of thyratron 41, this thyratron will be energized for successively smaller parts of the cycle, and tuner motor 50 will slow down as the mean carrier frequency is approached, but due to its inertia may slightly overshoot, in which case the voltage on conductor 90 now becomes positive and that on conductor 91 negative, and thyratron 42 will be energized for some part less than one-half of each cycle. This tends to rotate tuner motor 50 in the opposite direction and causes it to reverse its direction and drive the tuner in the reverse direction.

As the tuner passes the mean frequency again, thyratron 41 will begin to operate, thyratron 42 will stop operating, and thus the tuner motor may hunt back and forth a few times but will very quickly come to rest with the receiver tuned on the carrier frequency or extremely close thereto.

Should oscillator drift occur or should the frequency of the station change, a uni-directional voltage will again be impressed upon conductors 90 and 91, which will cause the tuner to operate to the necessary extent to keep the tuning on the carrier frequency. Deviations of the carrier due to modulation occur with such rapidity that they have no effect on tuner motor 50, and since their integral over any appreciable length of time is zero, modulations will not cause change of tuning.

Should the receiver be set at one end of the dial and the operator wish to pick up a station at the other end of the dial without stopping on intervening stations, it is only necessary to keep signal-seeking plunger 63 depressed, thus keeping contacts 67 and 68 closed, and under such conditions incoming signals will not stop the operation of tuner motor 50 since +B voltage is applied to the grid of thyratron 41 through contacts 67 and 68, which by-pass tube 37.

The operation of the receiver as a signal-seeking amplitude modulation receiver is not essentially different from that already described because, as far as the discriminator is concerned, there is no diffeence between the voltage output which it delivers for either amplitude or frequency modulation as the tuning is varied.

It may be noted at this point that frequency modulation limiter and detector 9 are supplied with the output of intermediate frequency amplifier 7 when the receiver is operating on amplitude modulated signals, as well as when it is operated on frequency modulated signals, and the limiter and frequency modulation detector 9 control the operation of the tuner motor for reception of both amplitude and frequency modulated signals. No connection from amplitude modulation detector 8 to control tube 37 is shown, and none is either needed or desired.

Therefore, to operate as an A. M. receiver on signal-seeking, the operator will change switch 10 to the A. M. position, which also sets wave switch 10*a* to the A. M. band position, and will again press signal-seeking plunger 63 momentarily, when the same operation as already described will be repeated, but this time the receiver will stop at the position where the first amplitude modulated signal of predetermined strength is received.

Suppose, now, the operator wishes to operate the receiver to select a particular station by operation of plungers 64, 65, and 66. It is first necessary to calibrate or preset the cam switches by setting cam disks 82, 84, and 86, and any additional disks that may be provided. The operator first determines what station he wishes to allocate to each particular plunger. For example, suppose he has three local stations to which he prefers to listen, which may be designated as stations A, B, and C respectively, and these are to be selected by plungers 64, 65, and 66 respectively. The signal-seeking plunger may then be depressed and kept depressed until the dial shows that the receiver is nearly on the frequency of station A.

On release of plunger 63 the receiver will continue to operate, and if station A is on the air, it will be tuned in and the receiver will stop at that setting. The listener may then listen to the program until a station announcement is heard, and if the station announcement confirms that he is on the desired station, he will then rotate cam disk 82 until cam 83 is in the middle of its travel past movable contact 76. Thereafter, depression of plunger 64 will always cause the receiver to stop by signal-seeking action at that setting, provided the station is on the air and switch 10 is set in the correct position.

If the station announcement shows that it is not the desired station which is being received, this means that either the desired station was passed over because the signal-seeking button was held down too long, or the button was not held down long enough, in which case the receiver has tuned in another station intervening in the frequency spectrum ahead of the desired station. In any case plunger 63 may again be pressed until the receiver stops on the desired station, in which case the adjustment of disk 82 is made as before, above described.

Similar adjustments of the other wheels or disks 84 and 86 will be made providing it is desired to set all three of these for A. M. stations. If it is desired to allocate one or more of them for F. M. stations, they will be adjusted by the same procedure, after setting switches 10 and 10*a* to the F. M. position. Thereafter any station previously set may be tuned by depressing its corresponding plunger.

At this point it may be noted that the operation of the cam switches should not be made critical since they do not actually stop the receiver tuning. This occurs solely by signal-seeking action, and the purpose of these switches is merely to prevent the signal-seeking action from stopping the tuning except in the immediate neighborhood of the desired station.

For example, if station A has a frequency of 950 kc., cam 83 may be arranged so as to open switch contact 76 over a range corresponding from 944 to 956 approximately. As stated, this is not critical, and the only precaution to be observed is to see that the switch is not opened on an adjacent channel, for example, 940 or 960, as this might cause the receiver to tune a station at 940 or 960 when a 950 kc. station is desired.

Suppose now it is desired to receive station A, which has been preset on plunger 64. Upon depression of plunger 64, plunger 66 is released and returns to front position, opening contacts 74 and 75. Thereafter contact 70 closes against contact 71, thereby establishing a circuit through contacts 76 and 77, closing the left-hand half of tuner motor winding 53 on the A. C. power source, by-passing thyratron 41. This will cause the tuner motor to operate at a relatively high rate of speed, and this operation will continue until cam 83 engages movable contact 76 and opens the motor circuit at 77.

During this operation firing of thyratron 41 has no effect. Shortly prior to opening of switch contact 76 by cam 83, the discriminator will have begun to supply + voltage to conductor 91 and negative voltage to conductor 90, so that when contact 76 opens from contact 77, thyratron 41 will have begun to fire on each half cycle.

Since the motor will now be energized only every other half cycle instead of all the time, its speed will drop considerably, and as the tuning approaches that of the carrier of station A, the positive voltage upon the grid of thyratron 41 will decrease and will become zero at the carrier frequency. Should the inertia of the tuner motor carry the tuning slightly past this carrier frequency, thyratron 42 will be energized and will tend to rotate the motor in the opposite direction, and it may hunt back and forth a few times, as already described, but will quickly come to rest at or very close to the frequency of the desired station.

The tuning in of other preset A. M. stations is accomplished in the same way by pushing the appropriate plunger.

The presetting and tuning of desired F. M. stations is accomplished in exactly the same way except, of course, that switch 10 must be set to the F. M. position for operation.

In the specification I have explained the principles of my invention and the best mode in which I have contemplated applying those principles, so as to distinguish my invention from other inventions; and I have particularly pointed out and distinctly claimed the part, improvement, or combination which I claim as my invention or discovery.

While I have shown and described certain preferred embodiments of my invention, it will be understood that modifications and changes may be made without departing from the spirit and scope thereof, as will be clear to those skilled in the art.

I claim:

1. A signal-seeking control system for a wave-signal receiver comprising, a tuner, an induction motor driving said tuner, said motor comprising one stator section energized from the A. C. line and a second and split section in quadrature with said first section, said split section being connected for selective rotation of said motor in either direction, and a control circuit for stopping rotation of said motor in response to reception of either a frequency or amplitude modulated signal of predetermined strength, a plurality of station selectors initiating rotation of said motor, and means operated by each selector for selectively disabling the control circuit except over a predetermined small portion of the frequency spectrum scanned by said tuner.

2. A signal-seeking control system for a wave-signal receiver comprising, a tuner, an induction motor driving said tuner, said motor comprising one station section energized from the A. C. line and a second and split section in quadrature with said first section, said split section being connected for selective rotation of said motor in either direction, and a control circuit for stopping rotation of said motor in response to reception of either a frequency or amplitude modulated signal of predetermined strength, a plurality of station selectors initiating rotation of said motor, and means operated by each selector for selectively disabling the control circuit except over a predetermined small portion of the frequency spectrum scanned by said tuner, said last mentioned means being adjustable to vary the position of said small portion of the spectrum for each selector.

3. A signal-seeking control system for a wave-signal receiver comprising, a tuner, an induction motor driving said tuner, said motor comprising one stator section energized from the A. C. line and a second and split section in quadrature with said first section, said split section being connected for selective rotation of said motor in either direction, and a control circuit for stopping rotation of said motor in respone to reception of either a frequency or amplitude modulated signal of predetermined strength, a plurality of station selectors, means for initiating rotation of said motor, and means operated by each selector for selectively disabling the control circuit except over a predetermined small portion of the frequency spectrum scanned by said tuner.

4. A signal-seeking control system for a wave-signal receiver comprising, a tuner, an induction motor driving said tuner, said motor comprising one stator section energized from the A. C. line and a second and split section in quadrature with said first section, said split section being connected for selective rotation of said motor in either direction, and a control circuit for stopping rotation of said motor in response to reception of either a frequency or amplitude modulated signal of predetermined strength, a plurality of station selectors, means for initiating rotation of said motor, and means operated by each selector for selectively disabling the control circuit except over a predetermined small portion of the frequency spectrum scanned by said tuner, said last mentioned means being adjustable to vary the position of said small portion of the spectrum for each selector.

5. A signal-seeking control system for a wave-signal receiver comprising, a tuner, an induction motor driving said tuner, said motor comprising one stator section energized from the A. C. line and a second and split section in quadrature with said first section, said split section being connected for selective rotation of said motor in either direction, and a control circuit for stopping rotation of said motor in response to reception of either a frequency or amplitude modulated signal of predetermined strength, a plurality of station-selecting plungers initiating rotation of said motor, and means operated by each plunger for selectively disabling the control circuit except over a predetermined small portion of the frequency spectrum scanned by said tuner.

6. A signal-seeking control system for a wave-signal receiver comprising, a tuner, an induction motor driving said tuner, said motor comprising one stator section energized from the A. C. line and a second and split section in quadrature with said first section, said split section being connected for selective rotation of said motor in either direction, and a control circuit for stopping rotation of said motor in response to reception of either a frequency or amplitude modulated signal of predetermined strength, a plurality of station-selecting plungers initiating rotation of said motor, and means operated by each plunger for selectively disabling the control circuit except over a predetermined small portion of the frequency spectrum scanned by said tuner, said last mentioned means being adjustable to vary the position of said small portion of the spectrum for each plunger.

7. A signal-seeking control system for a wave-signal receiver comprising, a tuner, an induction motor driving said tuner, said motor comprising one stator section energized from the A. C. line and a second and split section in quadrature with said first section, said split section being connected for selective rotation of said motor in either direction, and a control circuit for stopping rotation of said motor in response to reception of either a frequency or amplitude modulated signal of predetermined strength, said motor being arranged to be set into rotation whenever said control circuit is disabled, a plurality of station-selecting plungers, and means controlled by each plunger for disabling said control circuit upon operation of any plunger, and thereafter reestablishing said control circuit over a predetermined small portion of the frequency spectrum scanned by said tuner.

8. A signal-seeking control system for a wave-signal receiver comprising, a tuner, an induction motor driving said tuner, said motor comprising one stator section energized from the A. C. line and a second and split section in quadrature with said first section, said split section being connected for selective rotation of said motor in either direction, and a control circuit for stopping rotation of said motor in response to reception of either a frequency or amplitude modulated signal of predetermined strength, and arranged to initiate rotation of said motor whenever said control circuit is disabled, a plurality of station-selecting plungers, means operated by each plunger for selectively disabling the control circuit except over a predetermined small portion of the frequency spectrum scanned by said tuner, and means synchronized with said motor for selectively reestablishing said control circuit over said predetermined small portion of said spectrum.

9. A signal-seeking control system for a wave-signal receiver comprising, a tuner, an induction motor driving said tuner, said motor comprising one stator section energized from the A. C. line and a second and split section in quadrature with said first section, said split section being connected for selective rotation of said motor in either direction, and a control circuit for stopping rotation of said motor in response to reception of either a frequency or amplitude modulated signal of predetermined strength, and arranged to initiate rotation of said motor whenever said control circuit is disabled, a plurality of station-selecting plungers, means operated by each plunger for selectively disabling the control circuit except over a predetermined small portion of the frequency spectrum scanned by said tuner, and an additional plunger for causing rotation of said motor with said control circuit in operation over the spectrum of said tuner.

10. In a signal-seeking receiver for both amplitude and frequency modulated signals, in combination, a tuner, an induction motor driving said tuner, said motor comprising one stator section energized from the A. C. line and a second and split section in quadrature with said first section, said split section being connected for selective rotation of said motor in either direction, and a control circuit, including a thermionic tube and circuits for stopping rotation of said motor in response to reception of either a frequency or amplitude modulated signal of predetermined strength, said tube having its circuits so arranged that rotation of said motor is initiated whenever said control circuit is disabled, a plurality of station-selecting plungers, means operated by each of said plungers for disabling said control circuit, and means synchronized with said motor for reestablishing said control circuit over a predetermined small portion of the frequency spectrum scanned by said tuner.

11. A signal-seeking control system for a wave-signal receiver comprising, a tuner, an induction motor driving said tuner, said motor comprising one stator section energized from the A. C. line and a second and split section in quadrature with said first section, said split section being connected for selective rotation of said motor in either direction, and a control circuit for stopping operation of said motor in response to reception of either a frequency or amplitude modulated signal of predetermined strength, and arranged to initiate operation of said motor whenever said control circuit is disabled, a plurality of station-selecting plungers, a plurality of switch elements each operated by one of said station-selecting plungers and each arranged to respectively disable and reestablish said control circuit, and each switch element including a portion thereof synchronized with said motor for disabling said control circuit and thereafter reestablishing it over a predetermined small portion of the frequency spectrum scanned by said tuner.

12. A signal-seeking control system for a wave-signal receiver comprising, a tuner, an induction motor driving said tuner, said motor comprising one stator section energized from the A. C. line and a second and split section in quadrature with said first section, said split section being connected for selective rotation of said motor in either direction, and a control circuit for stopping rotation of said motor in response to reception of either a frequency or amplitude modulated signal of predetermined strength, and arranged to initiate rotation of said motor whenever said control circuit is disabled, a plurality of station-selecting plungers, a plurality of switch elements each operated by one of said station-selecting plungers and each arranged to respectively disable and reestablish said control circuit, and each switch element including a portion thereof synchronized with said motor for disabling said control circuit and thereafter reestablishing it over a predetermined small portion of the frequency spectrum scanned by said tuner, said last mentioned portions being respectively adjustable to shift the position of each predetermined small portion of the frequency spectrum.

13. A signal-seeking control system for a wave-signal receiver comprising, a tuner, an induction motor driving said tuner, said motor comprising one stator section energized from the A. C. line and a second and split section in quadrature with said first section, said split section being connected for selective rotation of said motor in either direction, and a control circuit for stopping rotation of said motor in response to reception of either a frequency or amplitude modulated signal of predetermined strength, a plurality of station selectors initiating rotation of said motor, and means operated by each selector for selectively disabling the control circuit except over a predetermined small portion of the frequency spectrum scanned by said tuner, said control circuit including a frequency discriminator network, a thermionic tube controlled thereby, and a pair of gas discharge tubes controlled thereby, said discharge tubes controlling the rotation of said motor.

14. A signal-seeking control system for a wave-signal receiver comprising, a tuner, an induction motor driving said tuner, said motor comprising one stator section energized from the A. C. line and a second and split section in quadrature with said first section, said split section being connected for selective rotation of said motor in either direction, and a control circuit for stopping rotation of said motor in response to reception of either a frequency or amplitude modulated signal of predetermined strength, a plurality of station selectors initiating rotation of said motor, means operated by each selector for selectively disabling the control circuit except over a predetermined small portion of the frequency spectrum scanned by said tuner, a double frequency discriminator network delivering two voltage outputs of opposite sign respectively, a pair of gas discharge tubes controlling the operation of said tuner, each tube comprising a control electrode, and means for applying the two voltage outputs from said discriminator to the control electrodes of said discharge tubes respectively, and a thermionic control tube having an output circuit and having a relay in its output circuit for applying an overriding bias to the control electrode of one of said gas discharge tubes.

15. The combination claimed in claim 14, in which said relay is of the lock-in type held in by the space current of said control tube, and in which a negative voltage from the output of said discriminator is applied to the grid of said control tube as the tuning approaches resonance with an incoming signal.

16. A signal-seeking control system for a wave-signal receiver comprising, a tuner, an induction motor driving said tuner, said motor comprising one stator section energized from the A. C. line and a second and split section in quadrature with said first section, said split section being connected for selective rotation with said motor in either direction, and a control circuit for stopping rotation of said motor in response to reception of either a frequency or amplitude modulated signal of predetermined strength, a plurality of station selectors initiating rotation of said motor, and means operated by each selector for selectively disabling the control circuit except over a predetermined small portion of the frequency spectrum scanned by said tuner, each of said station selectors when operated closing a circuit through one part of the split section of said motor to provide initial operation thereof.

17. The combination claimed in claim 16, in which there is provided a plurality of switches, operatively connected with each station selector, in series with one part of the split section of said motor and with a source of power, said switches forming a circuit closed by operation of any one of said station selectors and one switch associated with each station selector being operable to open circuit position over a small portion of the frequency spectrum scanned by said tuner by means operated in synchronism therewith.

MADISON G. NICHOLSON, Jr.

REFERENCES CITED

The following references are of record in the file of this patent:

UNITED STATES PATENTS

| Number | Name | Date |
|---|---|---|
| 2,174,566 | Case | Oct. 3, 1939 |
| 2,326,738 | Andrews | Aug. 17, 1943 |
| 2,350,543 | Wells | June 6, 1944 |